United States Patent [19]
Sims

[11] Patent Number: 5,469,338
[45] Date of Patent: Nov. 21, 1995

[54] AUTOMOBILE STEERING WHEEL AND TURN SIGNAL INDICATOR

[76] Inventor: Christopher A. Sims, P.O. Box 367, 10526 Old Hwy 43, Creola, Ala. 36525

[21] Appl. No.: 281,597

[22] Filed: Jul. 28, 1994

[51] Int. Cl.[6] .................................................... B60Q 1/00
[52] U.S. Cl. .......................................... 362/61; 200/61.54
[58] Field of Search .............................. 362/361, 61, 80, 362/83.3; 340/475, 476; 200/61.27, 61.54

[56] References Cited

U.S. PATENT DOCUMENTS 3,594,724  7/1971  Evers ................................ 200/61.54 X
4,684,918  8/1987  Solomon .......................... 200/61.27 X

*Primary Examiner*—Stephen F. Husar

[57] ABSTRACT

An automobile steering wheel and turn signal indicator comprising an automobile steering wheel having an annular handle, a hub adapted to be coupled to a steering column of an automobile, and at least one spoke extended therebetween; a turn signal indicator formed of a right push button switch and a left push button switch coupled to the hub with the right push button switch having an electrically conductive terminal adapted to be coupled between the right turn signal lights and an associated power supply of an automobile and the left push button switch having an electrically conductive terminal adapted to be coupled between the left turn signal lights and an associated power supply of an automobile, the right push button switch having a depressed orientation for activating the right turn signal lights and a released orientation for de-activating the right turn signal lights, the left push button switch having a depressed orientation for activating the left turn signals and a released orientation for de-activating the left turn signals.

1 Claim, 1 Drawing Sheet

AUTOMOBILE STEERING WHEEL AND TURN SIGNAL INDICATOR

BACKGROUND OF THE INVENTION

1. Field of the Invention

The present invention relates to an automobile steering wheel and turn signal indicator and more particularly pertains to allowing a driver of an automobile to signal for a turn without removing his hands from the steering wheel with an automobile steering wheel and turn signal indicator.

2. Description of the Prior Art

The use of signalling devices is known in the prior art. More specifically, signalling devices heretofore devised and utilized for the purpose of allowing a driver of an automobile to signal for a turn are known to consist basically of familiar, expected and obvious structural configurations, notwithstanding the myriad of designs encompassed by the crowded prior art which have been developed for the fulfillment of countless objectives and requirements.

By way of example, U.S. Pat. Des. 286,526 to Wardle et al. discloses an automobile steering wheel. U.S. Pat. Des. 289,029 to Envall et al. discloses an automobile steering wheel. U.S. Pat. Des. 306,715 to Vian discloses an automobile steering wheel. U.S. Pat. Des. 342,474 to Oki discloses a steering wheel with display panel. U.S. Pat. No. 4,063,789 to Kreisl discloses a signalling arrangement for automotive vehicle steering wheels.

While these devices fulfill their respective, particular objective and requirements, the aforementioned patents do not describe an automobile steering wheel and turn signal indicator that allows a driver to activate the right or left turn signals without removing his hands from the steering wheel.

In this respect, the automobile steering wheel and turn signal indicator according to the present invention substantially departs from the conventional concepts and designs of the prior art, and in doing so provides an apparatus primarily developed for the purpose of allowing a driver of an automobile to signal for a turn without removing his hands from the steering wheel.

Therefore, it can be appreciated that there exists a continuing need for new and improved automobile steering wheel and turn signal indicator which can be used for allowing a driver of an automobile to signal for a turn without removing his hands from the steering wheel. In this regard, the present invention substantially fulfills this need.

SUMMARY OF THE INVENTION

In the view of the foregoing disadvantages inherent in the known types of signalling devices now present in the prior art, the present invention provides an improved automobile steering wheel and turn signal indicator. As such, the general purpose of the present invention, which will be described subsequently in greater detail, is to provide a new and improved automobile steering wheel and turn signal indicator and method which has all the advantages of the prior art and none of the disadvantages.

To attain this, the present invention essentially comprises, in combination, an automobile steering wheel having an annular handle, a generally circular central hub adapted to be coupled to a steering column of an automobile, a first pair of spokes symmetrically disposed about the hub and horizontally extended outwards therefrom to the handle, a second pair of spokes symmetrically disposed about the hub below the first pair of spokes and angularly extended downwards and outwards therefrom to the handle, and a diametrical pair of recessed switch holes disposed on the hub near the periphery thereof and aligned with the first pair of spokes. A turn signal indicator is included and formed of a pair of push button switches with each push button switch extended through a separate switch hole to thereby define a left push button switch and a right push button switch. The right push button switch has an electrically conductive terminal adapted to be coupled between flasher circuitry and right turn signal lights of an automobile. The left push button switch has an electrically conductive terminal adapted to be coupled between flasher circuitry and left turn signal lights of an automobile. The right push button switch has a depressed orientation adapted for completing a circuit between the right turn signal lights, flasher circuitry, and power supply of an automobile to thereby activate the right turn signal lights and a released orientation for breaking the circuit to thereby de-activate the right turn signal lights. The left push button switch has a depressed orientation adapted for completing a circuit between the left turn signal lights, flasher circuitry, and power supply of an automobile to thereby activate the left turn signal lights and a released orientation for breaking the circuit to thereby de-activate the left turn signal lights. When a driver wishes to indicate a right turn, he can depress the right push button switch while simultaneously holding the steering wheel with both hands. When a driver wishes to indicate a left turn, he can depress the left push button switch while simultaneously holding the steering wheel with both hands.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile steering wheel and turn signal indicator which has all the advantages of the prior art signalling devices and none of the disadvantages.

It is another object of the present invention to provide a new and improved automobile steering wheel and turn signal indicator which may be easily and efficiently manufactured and marketed.

It is a further object of the present invention to provide a new and improved automobile steering wheel and turn signal indicator which is of durable and reliable construction.

An even further object of the present invention is to provide a new and improved automobile steering wheel and turn signal indicator which is susceptible of a low cost of manufacture with regard to both materials and labor, and which accordingly is then susceptible of low prices of sale to the consuming public, thereby making such an automobile steering wheel and turn signal indicator economically available to the buying public.

Still yet another object of the present invention is to provide a new and improved automobile steering wheel and turn signal indicator which provides in the apparatuses and methods of the prior art some of the advantages thereof, while simultaneously overcoming some of the disadvantages normally associated therewith.

Even still another object of the present invention is to provide a new and improved automobile steering wheel and turn signal indicator for allowing a driver of an automobile to signal for a turn without removing his hands from the steering wheel.

Lastly, it is an object of the present invention to provide a new and improved automobile steering wheel and turn signal indicator comprising an automobile steering wheel having an annular handle, a hub adapted to be coupled to a steering column of an automobile, and at least one spoke extended therebetween; and a turn signal indicator formed of a right push button switch and a left push button switch coupled to the hub with the right push button switch having an electrically conductive terminal adapted to be coupled between the right turn signal lights and an associated power supply of an automobile and the left push button switch having an electrically conductive terminal adapted to be coupled between the left turn signal lights and an associated power supply of an automobile, the right push button switch having a depressed orientation for activating the right turn signal lights and a released orientation for de-activating the right turn signal lights, the left push button switch having a depressed orientation for activating the left turn signals and a released orientation for de-activating the left turn signals, whereby when a driver wishes to indicate a right turn, he can depress the right push button switch while simultaneously holding the steering wheel with both hands, and when a driver wishes to indicate a left turn, he can depress the left push button switch while simultaneously holding .the steering wheel with both hands.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
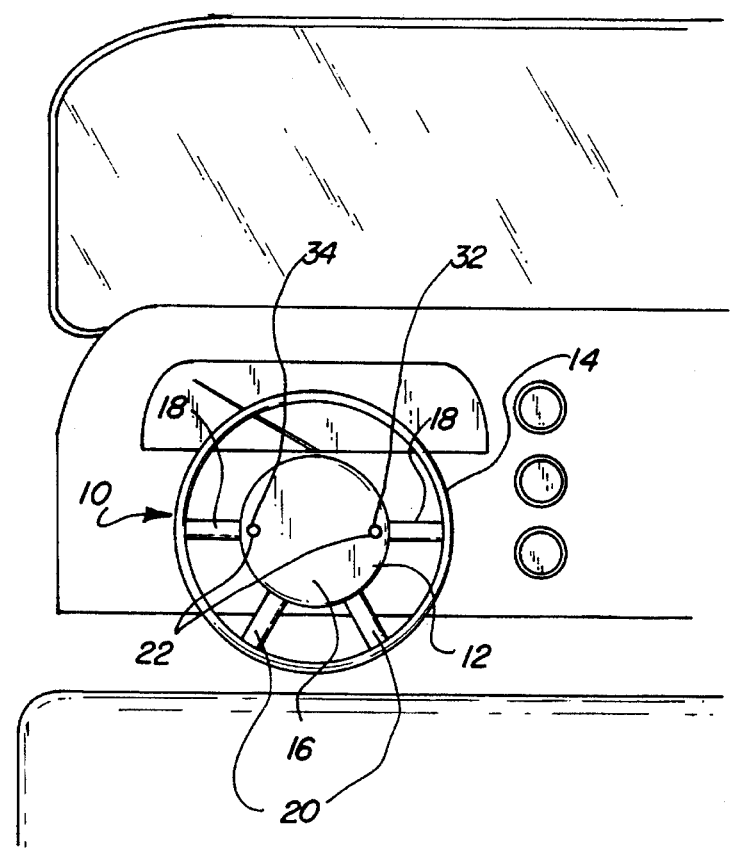
FIG. 1 is a side-elevational view of the preferred embodiment constructed in accordance with the principles of the present invention secured to a steering column within the driver's compartment of an automobile.
Figure 2:
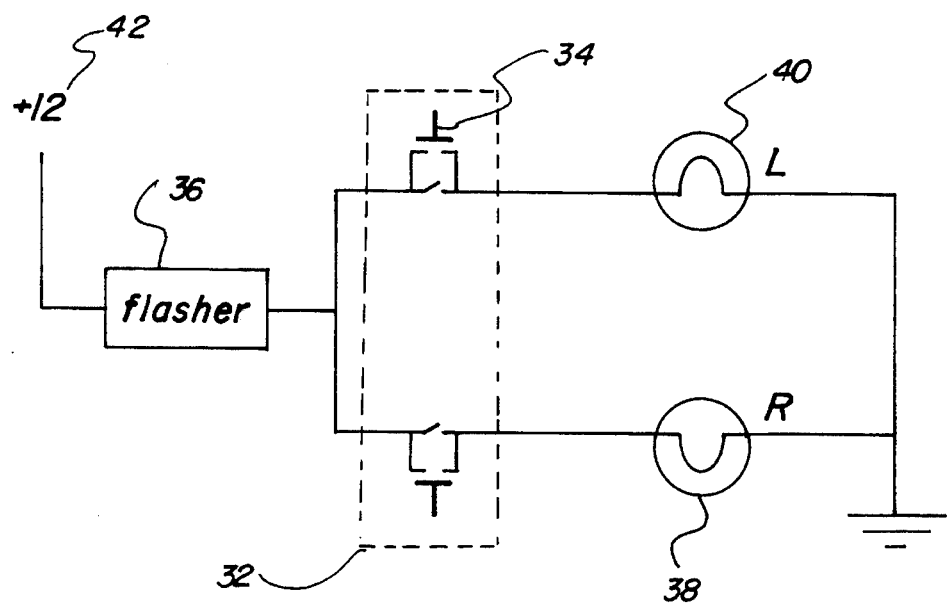
FIG. 2 is a schematic diagram depicting the coupling between the right and left push button switches on the steering wheel and their associated coupling with the flasher circuitry, signal lights, and power source of an automobile.

With reference now to the drawings, and in particular, to FIGS. 1 and 2 thereof, the preferred embodiment of the new and improved automobile steering wheel and turn signal indicator embodying the principles and concepts of the present invention and generally designated by the reference number 10 will be described.

Specifically, the present invention includes two major components. The major components are the steering wheel and the turn signal indicator. These components are interrelated to provide the intended function.

More specifically, it will be noted in the various Figures that the first major component is the steering wheel 12. The steering wheel is adapted for use with an automobile. The steering wheel has an annular handle 14 for allowing a user a firm grip. The steering wheel has a generally circular central hub 16 adapted to be coupled to a steering column of an automobile. A first pair of spokes 18 is symmetrically disposed about the hub and horizontally extended outwards therefrom to the handle to form an angle of 180 degrees therebetween for supporting the handle in a stationary configuration. A second pair of spokes 20 is also included and symmetrically disposed about the hub below the first pair of spokes and angularly extended downwards and outwards therefrom to the handle to form an angle of 60 degrees therebetween. Each spoke of the first pair and the second pair has a length equal to the radial extent of the hub. The steering wheel also includes a diametrical pair of recessed switch holes 22 disposed on the hub near the periphery thereof. The switch holes are aligned with the first pair of spokes and adapted to receive a turn signal indicator therein.

The second major component is the turn signal indicator 30. The turn signal indicator is electrically conductive. It is formed of a pair of disk-shaped push button switches. Each push button switch is extended through a separate switch hole 22 to thereby define a right push button switch 32 and a left push button switch 34. The right push button switch has an electrically conductive terminal adapted to be coupled between flasher circuitry 36 and right turn signal lights 38 of an automobile. The left push button switch has an electrically conductive terminal adapted to be coupled between flasher circuitry and left turn signal lights 40 of an automobile. The right push button switch has a depressed orientation adapted for completing a circuit between the right turn signal lights, flasher circuitry, and power supply 42 of an automobile to thereby activate the right turn signal lights. The right push button switch also has a released orientation for breaking the circuit between the right turn signal lights, flasher circuitry, and power supply to thereby de-activate the right turn signal lights. The left push button switch has a depressed orientation adapted for completing a circuit between the left turn signal lights, flasher circuitry, and power supply of an automobile to thereby activate the left turn signal lights. The left push button switch also has a released orientation for breaking the circuit between the left turn signal lights, flasher circuitry, and power supply of an automobile to thereby de-activate the left turn signal lights. When a driver wishes to indicate a right turn, he can depress the right push button switch 32 while simultaneously holding the steering wheel 12 with both hands. Likewise, when a driver wishes to indicate a left turn, he can depress the left push button switch 34 while simultaneously holding the steering wheel with both hands.

The present invention is adapted for use with motor vehicles and enables a person to activate turn signal lights without taking his hands off of the steering wheel. The present has a pair of push button switches, one on each side of the steering wheel. Buttons are recessed in the wheel at the three o'clock and nine o'clock positions, near the outside circumference of the hub. The right push button is depressed when signalling an intent to make a right turn, and the left push button is pressed when signalling an intent to make a left turn. Wiring extends from the underside of the buttons, through the steering wheel, to a pair of relays, and finally to each of the lights. The push button switches are normally open, with the circuit closing to allow electrical power to flow through the flasher circuitry, through a given push button, and to the signal lights when a given push button is depressed. Wiring attaches to the fuse box in the normal fashion, and the power source is the vehicle's 12 volt battery.

In use, when the driver is about to make a left turn, he simply depresses the left button on the steering wheel rather than removing his hand to access the turn lever as on prior art turn signalling devices. After the turn has been completed, the button returns to its original released position. By having the present invention installed in his vehicle, a driver need never remove his hands from the steering wheel to indicate a turn. Driving is a bit safer because the driver's hands remain on the wheel. It is also more convenient for the driver since the buttons may be easily accessed by simply using a thumb on the right or left hand. Greater convenience for the driver should result in fewer occurrences of forgetting to activate the blinker. The electrical connection between the push button switches and turn signal circuitry of the automobile would pass through the steering wheel and connect in parallel with the existing system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An automobile steering wheel and turn signal indicator for allowing a driver of an automobile to signal for a turn without removing his hands from the steering wheel comprising, in combination:

an automobile steering wheel having an annular handle, a generally circular central hub adapted to be coupled to a steering column of an automobile, a first pair of spokes symmetrically disposed about the hub and horizontally extended linearly outwards therefrom to the handle to form an angle of 180 degrees therebetween, a second pair of spokes symmetrically disposed about the hub below the first pair of spokes and angularly extended downwards and linearly outwards therefrom to the handle to form an angle of 60 degrees therebetween and with each spoke of the first pair and second pair having a length equal to the radial extent of the hub, and a diametrical pair of recessed switch holes disposed on the hub near the periphery thereof and aligned with the first pair of spokes; and a turn signal indicator formed of a pair of disk-shaped push button switches with each push button switch extended through a separate switch hole to thereby define a left push button switch and a right push button switch, the right push button switch having an electrically conductive terminal adapted to be coupled between flasher circuitry and right turn signal lights of an automobile, the left push button switch having an electrically conductive terminal adapted to be coupled between flasher circuitry and left turn signal lights of an automobile, the right push button switch having a depressed orientation adapted for completing a circuit between the right turn signal lights, flasher circuitry, and power supply of an automobile to thereby activate the right turn signal lights and a released orientation for breaking the circuit to thereby de-activate the right turn signal lights, the left push button switch having a depressed orientation adapted for completing a circuit between the left turn signal lights, flasher circuitry, and power supply of an automobile to thereby activate the left turn signal lights and a released orientation for breaking the circuit to thereby de-activate the left turn signal lights, whereby when a driver wishes to indicate a right turn, he can depress the right push button switch while simultaneously holding the steering wheel with both hands, and when a driver wishes to indicate a left turn, he can depress the left push button switch while simultaneously holding the steering wheel with both hands.

\* \* \* \* \*